United States Patent [19]
Goodson et al.

[11] Patent Number: 5,636,244
[45] Date of Patent: Jun. 3, 1997

[54] METHOD AND APPARATUS FOR INITIALIZING EQUALIZER COEFFICENTS USING PERIDIOC TRAINING SEQUENCES

[75] Inventors: Richard L. Goodson; Lee T. Gusler, Jr., both of Huntsville; Mickey C. Rushing, Harvest, all of Ala.

[73] Assignee: Motorola, Inc., Schaumburg, Ill.

[21] Appl. No.: 507,175

[22] Filed: Jul. 26, 1995

[51] Int. Cl.$^6$ .............. H04B 3/04; G06F 17/14
[52] U.S. Cl. .............. 375/231; 375/222; 375/232; 364/726
[58] Field of Search .................. 375/222, 229, 375/231, 232, 346, 350; 364/724.19, 724.2, 725–726

[56] References Cited

U.S. PATENT DOCUMENTS

| | | | |
|---|---|---|---|
| 4,027,257 | 5/1977 | Perreault | 333/18 |
| 4,359,778 | 11/1982 | Lee | 375/231 |
| 4,621,366 | 11/1986 | Cain et al. | 375/222 |

*Primary Examiner*—Young T. Tse
*Attorney, Agent, or Firm*—Nancy R. Gamburg

[57] ABSTRACT

An apparatus and method for a data communications device such as a modem (100) to generate initial coefficient values for an equalizer (440) from a transmitted training signal received via a channel, in which the transmitted training signal has predetermined characteristics. The apparatus and method embodiments of the invention determine a finite impulse response characteristic of the inverse frequency response of the channel based on a received training signal and the transmitted training signal (610). In the various embodiments, an energy index, a magnitude index, and an offset index are generated and combined with an equalizer length index to select a sequence of initial coefficient values for the equalizer (630, 640, 650).

25 Claims, 5 Drawing Sheets

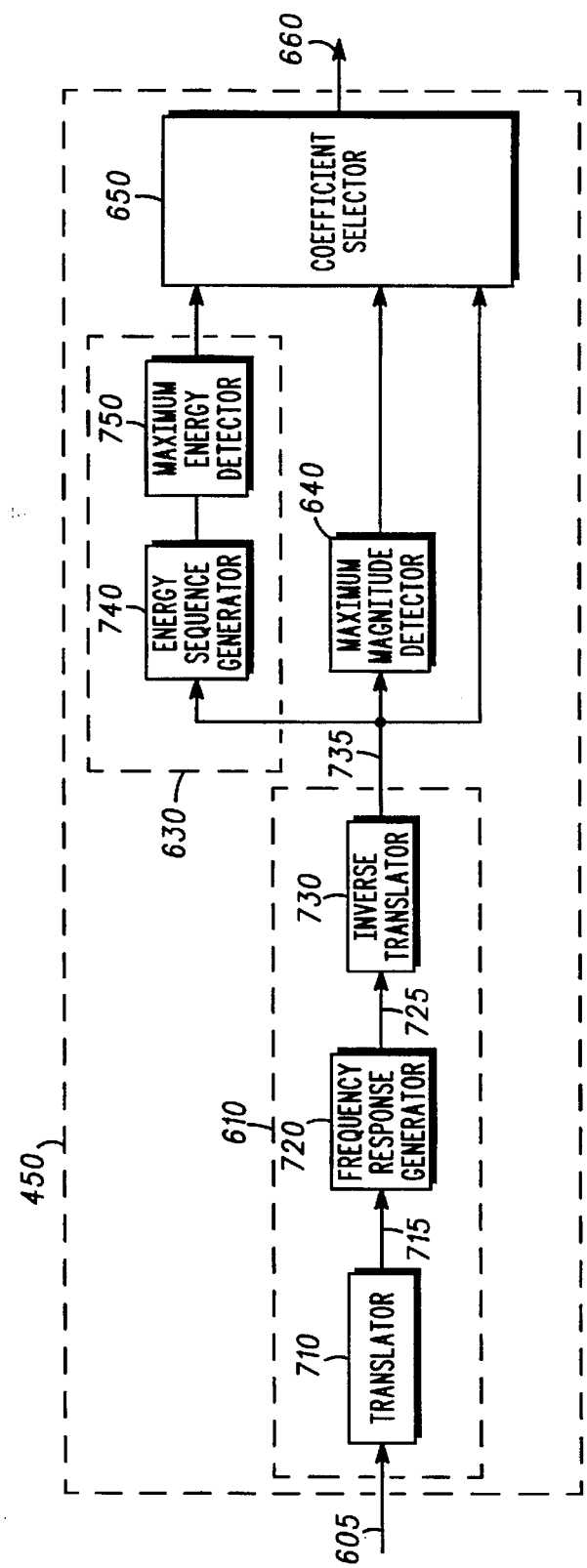
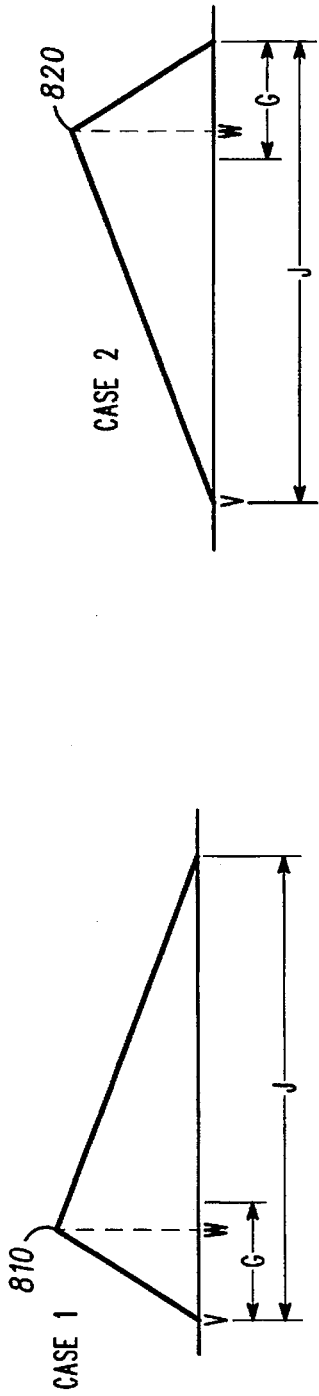

METHOD AND APPARATUS FOR INITIALIZING EQUALIZER COEFFICENTS USING PERIDIOC TRAINING SEQUENCES

FIELD OF THE INVENTION

This application relates in general to data communications devices, and more specifically to determining initial values of equalizer coefficients in an equalizer used in data communications devices.

BACKGROUND OF THE INVENTION

Presently, data communications devices ("DCDs") and other data communication equipment ("DCE"), such as modems, for example, are used to transport digital data between data terminal equipment such as personal computers and workstations, over channels such as a General Switched Telephone Network ("GSTN"). Typically, the communication signal includes digital data in the form of a carrier signal that is modulated by a predetermined transmit constellation of signal points. A set of signal points taken from the transmit constellation represents a digital code or value to be transported. At the local DCD, a carrier signal is thus modulated with the set of constellation signal points corresponding to the digital code or value to be transmitted over the channel. The channel may introduce amplitude distortion, phase distortion, additive noise, carrier frequency offset, and other distortions or impairments. The received signal, having been distorted by the channel and having, for example, amplitude and phase distortions, should be equalized (or compensated) by the receiver in order to increase the accuracy of data transmission and increase the rate of data transfer over the channel.

Adaptive equalizers are known in the prior art and are used to provide the compensation to reduce the effects of distortion caused by a transmission channel. Digital Signal Processors, such as a Motorola M56002, may be used to implement an equalizer. Detailed descriptions of adaptive equalizers may be found throughout engineering literature, such as S. Qureshi, "Adaptive Equalization", Proceedings of the IEEE, Vol. 73, No. 9, pp. 1349–1387 (September, 1985). Equalizers typically have a predetermined, fixed number of indexed coefficients, referred to as an indexed set of equalizer coefficients, which may be indexed numbers such as a sequence $\{c(0), c(1), \ldots, c(k)\}$. In order to compensate for channel distortions, an equalizer should be initialized during a training period, i.e., the equalizer should start the compensation process with initial numerical values for the coefficients. While adaptive equalization is known in the art, however, there is little information available concerning establishing or setting these initial values for these equalizer coefficients.

A prior art method for initializing equalizer coefficients is to arbitrarily set one of the coefficients (usually near the middle of the sequence) to a numerical value of one and set all of the remaining coefficients to values of zero. This initialization method tends to be adequate for GSTN connections both having minimum distortions and having sufficient training time to allow an adaptive algorithm (such as an LMS algorithm) to generate more accurate coefficient values. If the distortions are more significant, or a shorter period of time is required or advisable for training, then this more arbitrary initialization method may be insufficient for proper equalization. Another prior art method for initializing equalizer coefficients is to set all of the coefficients to predetermined numerical values corresponding to a channel having typical or average characteristics. This initialization method may be adequate for equalizing channels having typical characteristics, but may not allow the adaptive algorithm to generate coefficients for channels having more atypical impairments, such as either minimum distortions or significant distortions.

As a result, there continues to be a need to provide an apparatus and method for generating equalizer coefficients to more accurately initialize an equalizer during a potentially short period of time for training, in order to subsequently permit an adaptive algorithm to generate coefficients to equalize for a broad spectrum of channel distortions and other impairments.

BRIEF DESCRIPTION OF THE DRAWINGS

FIG. 7 is a block diagram illustrating an embodiment of an equalizer coefficient generator in accordance with the present invention.

FIG. 8A illustrates a first signal related to an index selection method in accordance with the present invention.

FIG. 8B illustrates a second signal related to an index selection method in accordance with the present invention.

DESCRIPTION OF THE PREFERRED EMBODIMENT

Figure 1:
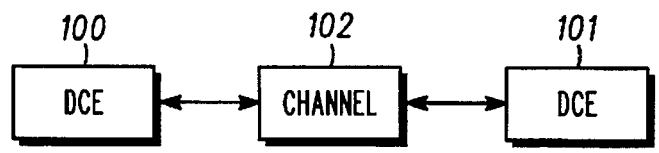
FIG. 1 is a block diagram illustrating a first modem connected to a second modem via a channel, for full duplex data transmission and reception.

FIG. 1 illustrates a first DCE 100, such as a first modem, connected to a second DCE 101, such as a second modem, via a channel 102. The modems typically operate in full-duplex, such that each may transmit data and receive data at the same time. In order to compensate for various distortions and impairments which usually exist or occur in the channel during data transmission, various protocols and standards have evolved, such as the International Telecommunication Union (ITU) Recommendation V.34, involving the use of a periodic signal having predetermined, defined characteristics, transmitted from the sending DCE to the receiving DCE, during the initial communication period (training period) in which the two devices train with each other. For example, as defined in Section 10.1.3.6 of the V.34 standard, the transmitted training signal consists of six periods of a sequence of 48 symbols having predetermined or defined amplitude, frequency and phase characteristics, for use by the receiving modem to train its equalizer. In addition to a transmitted training signal from the V.34 recommendations, in accordance with the present invention, other predetermined transmitted signals may also be used, such as the various classes of periodic signals described in S. Qureshi, "Fast Start-up Equalization with Periodic Training Sequences", IEEE Transactions on Information Theory, Vol. IT-23, No. 5, September 1977. The receiving DCE may analyze the received training signal, which has typically been distorted or impaired by the channel, in light of the standard training signal known (or assumed) to have been transmitted.

Figure 2:
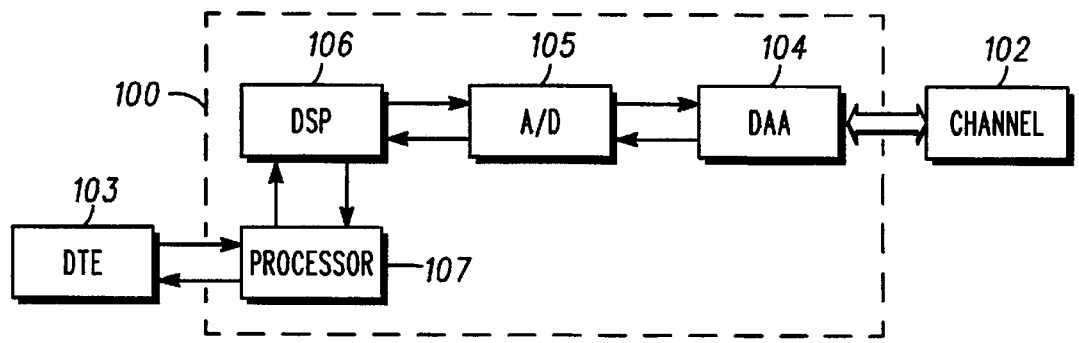
FIG. 2 is a block diagram illustrating a first embodiment of a modem or other DCE in accordance with the present invention.

FIG. 2 is a block diagram illustrating a first embodiment of a modem or other DCE in accordance with the present invention. As shown in FIG. 2, a modem 100 is coupled or connected to a DTE 103, such as a computer, and coupled to a channel 102, for data transmission and reception. Within the modem 100, a data access arrangement 104 known as a "DAA" receives an analog signal transmitted on the channel 102. DAAs are known in the prior art and may be made of a variety of discrete components, including analog multiplexers, resistors, capacitors, and operational amplifiers, or may be embodied in whole or part as an integrated circuit, and performs such functions as impedance matching and power level adjustment. Typically connected to the DAA 104 is an analog-to-digital and digital-to-analog converter 105, referred to herein as an analog-digital ("A/D") converter, such as an SGS Thompson ST 7544 or ST 7545, which samples and converts an analog signal received from the channel 102 to a sampled, digital form, and converts digital information to analog form for transmission over the channel 102. Equivalently to the use of an A/D converter, a coder-decoder ("codec") may be utilized in place of the A/D converter. The A/D converter 105 is then connected to a digital signal processor ("DSP") 106, such as a Motorola M56002. The DSP 106 may be used in a first embodiment of the invention herein, performing the various functions described in detail below. The DSP 106 is connected to a microprocessor 107, such as a Motorola M68302, which may be coupled to a DTE 103 to transmit and receive digital information.

Figure 3:
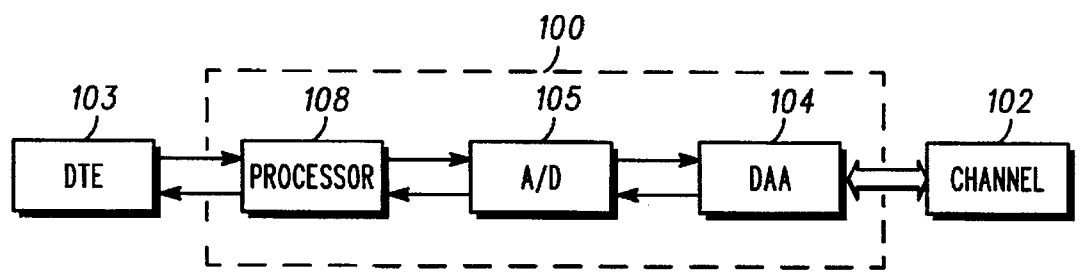
FIG. 3 is a block diagram illustrating a second embodiment of a modem or other DCE in accordance with the present invention.

FIG. 3 is a block diagram illustrating a second embodiment of a modem or other DCE in accordance with the present invention. Referring to FIG. 3, the DAA 104 and A/D converter 105 perform fie same functions, may be the identical components, and are similarly connected as previously discussed with reference to FIG. 2. In contrast with the modem 100 of FIG. 2, however, FIG. 3 illustrates a processor 108, such as a Motorola M68356, which performs the functions of both the DSP 106 and the microprocessor 107 of FIG. 2. The processor 108 may be used in a second embodiment of the invention herein, also performing the various functions described in detail below. The processor 108 may also be coupled to a DTE 103 to transmit and receive digital information. As a consequence of the interchangeability of a DSP with a processor in these various embodiments, the terms DSP and processor (or microprocessor) are used interchangeably and inclusively herein, such that use of one term may be interpreted to mean and include the various other processor embodiments.

For ease of reference, following is a list of symbols and abbreviations used herein and their associated meanings:

| | |
|---|---|
| s(n) | The baseband, periodic transmitted training signal. |
| T | The transmit symbol interval. |
| M/K | The ratio of sample rate to symbol rate. |

-continued

| | |
|---|---|
| $f_i$ | The frequency of the ith tone in the transmitted training signal. |
| $\theta_i$ | The phase of the ith tone in the transmitted training signal. |
| L | The number of tones in the transmitted training signal. |
| P | The number of samples in one period of the transmitted training signal. |
| n | The sample interval time index. |
| $S(e^{j\pi f_i T})$ | The frequency domain representation of the transmitted training signal. |
| r(n) | The time domain representation of the sampled, received training signal. |
| $R(e^{j\pi f_i T})$ | The frequency domain representation of the sampled, received training signal. |
| $A_i$ | The magnitude distortion of the ith tone in the sampled, received training signal. |
| $\phi$ | The phase distortion of the ith tone in the sampled, received training signal. |
| $H(e^{j\pi f_i T})$ | The frequency response of the periodic equalizer. |
| u(n) | The impulse response of the periodic equalizer |
| J | The length of the equalizer |
| e(n) | The energy in a subset of the periodic channel coefficients. |
| V | The energy index corresponding to subset having maximum energy. |
| W | The magnitude index corresponding the maximum magnitude of the periodic channel coefficients. |
| c(i) | The equalizer coefficients, where $i = 0,1,2,\ldots,J-1$. |
| Y | The coefficient index for equating the sequences $\{c(0), \ldots, c(J-1)\} = \{u(Y), \ldots, u(Y+J-1)\}$. |
| x(n) | The input to an equalizer |
| y(n) | The output of an equalizer |

Figure 4:
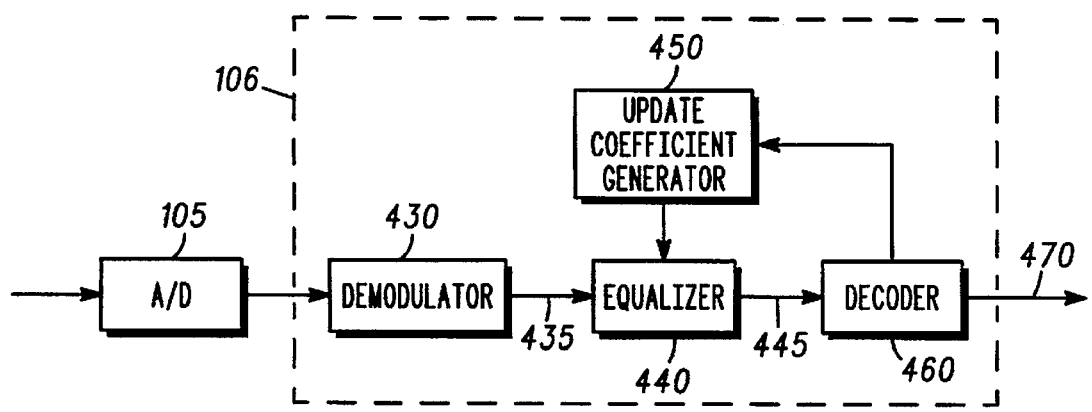
FIG. 4 is a block diagram illustrating a modem having an equalizer in accordance with the present invention.

FIG. 4 is a block diagram which illustrates a modem having an equalizer 440 for compensating or equalizing distortions caused by the channel 102 when data is transmitted from, for example, a second modem 101 to a first modem 100. As discussed above, the A/D converter 105 samples and converts an analog signal to digital form. In various embodiments, a demodulator 430 may be utilized to convert the digital form (a modulated signal) to a baseband signal (a demodulated signal). The equalizer 440 equalizes an input signal x(n), such as the baseband signal or the sampled digital form signal to produce an equalized signal y(n) on line 445. The decoder 460 then decodes the equalized signal to produce digital data on decoder output line 470. In addition, the decoder sends information to a coefficient update generator 450 for generating updated values for the equalizer coefficients. The coefficient update generator may use an LMS algorithm, for example, to generate updated values for the equalizer coefficients.

Figure 5:
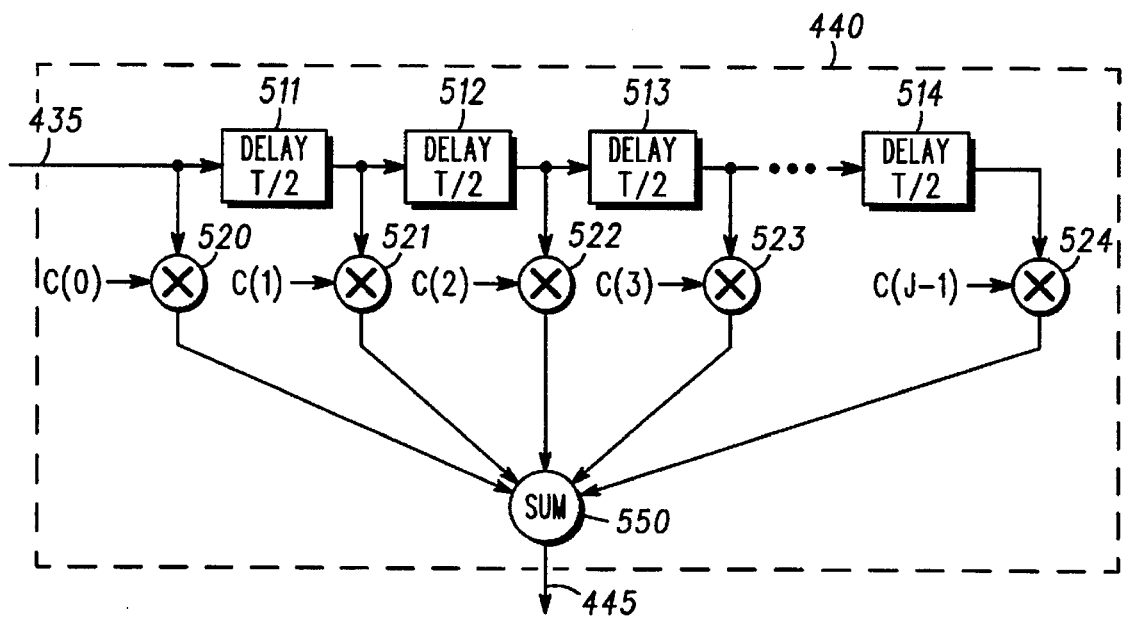
FIG. 5 is a block diagram illustrating an equalizer of predetermined length in accordance with the present invention.

FIG. 5 is a block diagram illustrating an equalizer 440 having a predetermined length in accordance with the present invention. The equalizer 440 has taps, spaced at intervals of T/2, and has a predetermined length of J. The input signal x(n) on line 435, such as a baseband signal or other sampled, received signal, is delayed in delay units, each having an additional delay of T/2 seconds. The output of the first delay unit 511 is x(n−1), the output of the second delay unit 512 is x(n−2), the output of the third delay unit is x(n−3), and so on, such that the output of the last delay unit 514 is x(n−(J−1)). There are a total of J−1 delay units for the structure, and J equalizer coefficients, such that the equalizer is said to have "J" taps or is of length "J". The sequence of complex numbers c(0), c(1), c(2), c(3), ..., c(J−1) are a plurality of equalizer coefficients. Multipliers 520, 521, 522, 523, ..., through 524 combine the input signal x(n) and the various delayed input signals with corresponding equalizer coefficients, which are summed in summer 550, resulting in an equalized signal y(n) output on line 445 which may be represented as:

$$y(n) = \sum_{i=0}^{J-1} c(i)x(n-i)$$

If the equalizer coefficients are adaptively adjusted or changed over time, then the equalizer is referred to as an adaptive equalizer. In accordance with the present invention, before an adaptive equalizer becomes operational for receiving data, the equalizer coefficients are assigned initial values.

Figure 6:
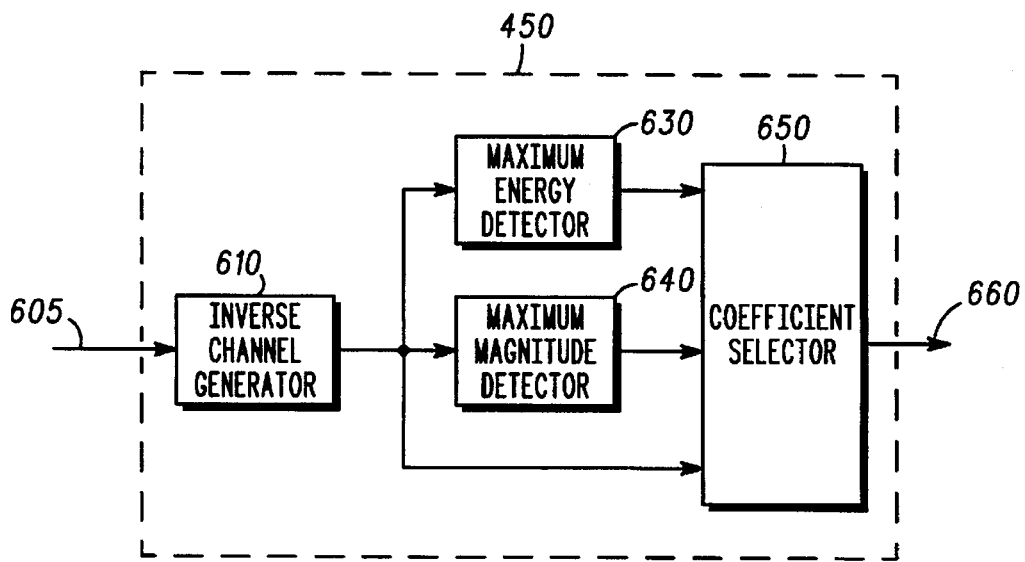
FIG. 6 is a block diagram illustrating an embodiment of an equalizer coefficient generator in accordance with the present invention.

FIG. 6 is a block diagram illustrating an embodiment of an equalizer coefficient generator 450 in accordance with the present invention. The equalizer coefficient generator 450 generates initial values for a plurality of equalizer coefficients, and as discussed above, may be implemented as a digital signal processor, a microprocessor, or another form of processor. A sampled, received and sampled periodic signal having a period with P samples in one period, such as a received training signal which has been sampled by an analog-digital converter 105, is received by an inverse channel generator or impulse response generator 610. The impulse response generator produces an impulse response, u(n), that is represented by an impulse response sequence {u(0), u(1), u(2), . . . , u(n)}. The impulse response sequence represents the inverse characteristics of the channel, and is a finite impulse response characteristic of the inverse frequency response of the channel. In theory, if the impulse response sequence and the channel are connected in series (a cascade arrangement of two linear systems), then the resulting overall frequency response of the series connection may be equivalent to an approximately flat bandpass filter with a bandwidth approximately equal to the bandwidth of the channel. Because the input signal is periodic with P samples in one period, the impulse response sequence is also periodic with the same period having P samples in one period, and may therefore be represented by a plurality or set of "P" channel (or impulse) coefficients, which may be complex numbers.

Figure 10:
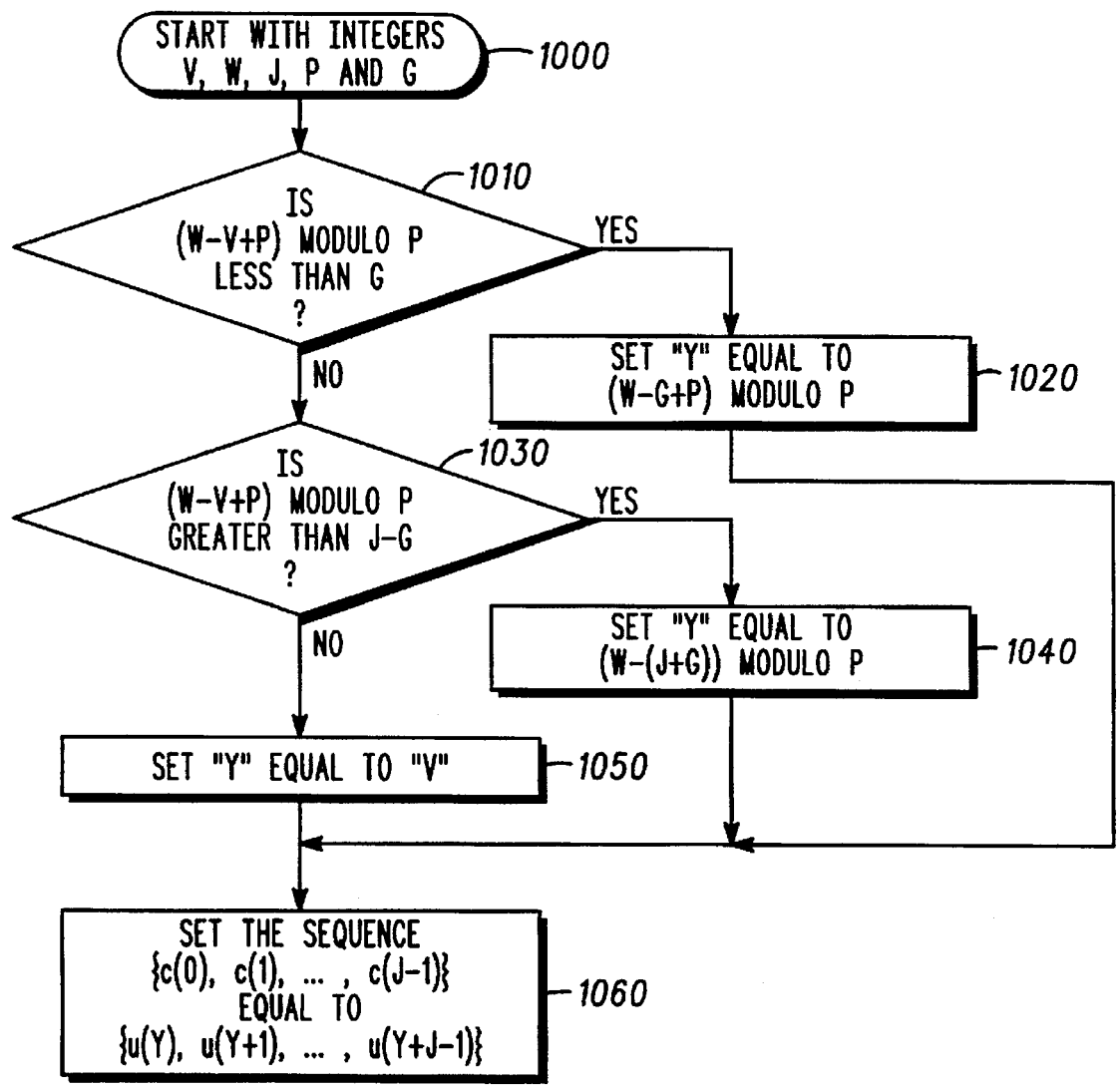
FIG. 10 is a flow diagram illustrating selecting coefficients in accordance with the method of the present invention.

Continuing to refer to FIG. 6, the maximum energy detector 630 generates subsets of the plurality of channel coefficients, each subset having a subset index, each subset further having a predetermined length "J" and comprising adjacent channel coefficients. In addition, the maximum energy detector 630 determines the energy of each subset, and the subset having the maximum average energy has a corresponding index defined as energy index "V". During the same time period, a maximum magnitude detector 640 detects the maximum magnitude of the plurality of channel coefficients (the impulse response sequence) and generates a magnitude index "W" corresponding to the maximum magnitude. Both the energy index and the magnitude index values are transmitted to the coefficient selector 650. As discussed in greater detail below, the coefficient selector 650 selects a subset of the plurality of channel coefficients having a predetermined length, such as J, in response to the energy index V, the magnitude index W, and an offset index G, in light of the P samples of the impulse response and the subset length J. A method for selecting the subset in accordance with the present invention is illustrated in FIG. 10 and is discussed in detail below.

For ease of understanding the invention herein, the periodic, transmitted training signal may be represented by:

$$s(n) = \sum_{i=-\frac{L}{2}}^{\frac{L}{2}-1} e^{j(\frac{2\pi f_i nKT}{M} + \theta_i)}$$

in which the period contains P samples, the signaling or symbol rate is 1/T, and the sample rate is M/(KT). For most applications, M/K is equal to 2, and hereafter will be used as such. The frequency $f_i$ is represented as:

$$f_i = \frac{2i}{PT}, i = -\frac{L}{2}, \ldots, \frac{L}{2} - 1.$$

In the frequency domain, the transmitted training signal may be represented as:

$$S(e^{j\pi f_i T}) = \frac{1}{P} \sum_{n=0}^{P-1} s(n)e^{-j\pi f_i nT} = e^{j\theta_i} = S\left(e^{j\pi(f_i + \frac{2k}{T})T}\right)$$

which is periodic with period 2/T. When the transmitted training signal is received by a modem 100 via the channel 102 as a received training signal, the received training signal is usually not identical to the transmitted training signal, but is a distorted version of the transmitted training signal. The received training signal, having been sampled by the analog-digital converter 105 to form a sampled signal, r(n), may be represented in the time domain as:

$$r(n) = \sum_{i=-\frac{L}{2}}^{\frac{L}{2}-1} A_i e^{j(\pi f_i nT + \theta_i + \phi_i)}.$$

FIG. 7 is a block diagram illustrating an embodiment of an equalizer coefficient generator, in accordance with the present invention, for generating initial values for equalizer coefficients. The sampled signal r(n) from the analog-digital converter 105 is received by a translator 710 (part of the inverse channel (impulse response) generator 610) and converted to a frequency domain signal. In the preferred embodiment of the invention, a Discrete Fourier Transform ("DFT") is utilized to convert or translate the sampled signal r(n) to the frequency domain, and may be represented as:

$$R(e^{j\pi f_i T}) = \frac{1}{P} \sum_{n=0}^{P-1} r(n)e^{-j2\pi f_i nT} = A_i e^{j(\theta_i + \phi_i)} = R\left(e^{j\pi(f_i + \frac{2k}{T})T}\right)$$

Where $R(e^{j\pi f_i T})$ is a periodic frequency domain signal having a period 2/T.

Continuing to refer to FIG. 7, a frequency response generator 720 generates the frequency response of the inverse of the channel. The frequency response generator is based on the linear system relationship that an output signal divided by an input signal is the transfer function of the system, and that the inverse of the transfer function is the input signal divided by the output signal. Accordingly, the inverse frequency characteristics of the channel may be determined by $$H(e^{j\pi f_i T}) = \frac{S(e^{j\pi f_i T})R^*(e^{j\pi f_i T})}{|R(e^{j\pi f_i T})|^2 + \left| R\left(e^{j\pi(f_i + \frac{1}{T})T}\right) \right|^2}$$

where $H(e^{j\pi f_i T})$ is a frequency domain representation. The inverse translator 730 converters (or translates) the inverse frequency characteristics of the channel to the time domain, to produce a finite impulse response characteristic of the inverse frequency response of the channel. In a preferred embodiment, the inverse DFT for determining the impulse response may be evaluated by $$u(n) = \sum_{i=-\frac{L}{2}}^{\frac{L}{2}-1} H(e^{j\pi iT})e^{j2\pi i nT} = u(n+kP).$$

The impulse response is also periodic with P samples in one period, end may be expressed as an impulse response sequence $\{u(0), u(1), u(2), \ldots, u(n)\}$. Because the impulse response is periodic, a sequence of P complex numbers may describe the impulse response. In a preferred embodiment of the invention, a subset of these P complex numbers are used to generate the initial values for the equalizer coefficients. An equalizer in accordance with the present invention may utilize fewer than all of the available P coefficients, for ease of digital signal processing, and has J coefficients where J is less than P. In accordance with the present invention, a coefficient selector 650 is utilized to select a subset of channel coefficients from a plurality of subsets of channel coefficients. More specifically, each such subset is comprised of adjacent complex numbers of the impulse response sequence, and adjacent complex numbers are used because the complex numbers represent a time response, for use in real time equalization. In accordance with the present invention, two main criteria are utilized to select a subset of J adjacent channel coefficients, the maximum energy of the subset and the location of the energy maximum (the peak) of the channel coefficients within the adjacent channel coefficients.

Continuing to refer to FIG. 7, the energy sequence generator 740 receives the plurality of channel coefficients from the inverse channel (impulse response) generator 610 and generates an energy sequence based on the relation $$e(n) = \sum_{m=0}^{J-1} |u(n+m)|^2$$

for $n=0, \ldots, P-1$. The energy sequence $\{e(0), e(1), e(2), \ldots, e(P-1)\}$ is a sequence of positive real numbers. An energy index V is selected by maximum energy detector 750 and is determined by $e(V) \geq e(i)$, over all $i \neq V$ The index corresponding to the maximum value of the energy sequence element is equal to the energy index V. The subset of channel coefficients $\{u(V), u(V+1), \ldots, U(V+J-1)\}$ is then the subset of the plurality of subsets having maximum average energy.

The maximum magnitude detector 640 also receives the plurality of channel coefficients from the inverse channel (impulse response) generator 610 and detects the maximum magnitude of these values in the impulse response sequence. The magnitude index W is determined by $|u(W)| \geq |u(i)|$, over all $i \neq W$ The complex number u(W) is therefore the member of the impulse response sequence having the maximum magnitude.

In order to assure that the equalizer will update properly on subsequent data from an initial set of equalizer coefficient values, it has been determined empirically that the maximum magnitude equalizer coefficient should not be placed at or close to either the last or first coefficient of the equalizer. Accordingly, a subset of adjacent channel coefficients should be chosen such that the maximum magnitude occurs a predetermined or minimum allowable distance from the first and last equalizer coefficients. The first case, in which the maximum magnitude occurs a predetermined or minimum distance from the first equalizer coefficient, is depicted in FIG. 8A. The second case, in which the maximum magnitude occurs a predetermined or minimum distance from the last equalizer coefficient, is depicted in FIG. 8B. Referring to both FIG. 8A and FIG. 8B, an offset integer G is utilized in the preferred embodiment to assure that the maximum magnitude does not occur at or near the last or first coefficient of the equalizer. The integer G is used to force the maximum magnitude to be a minimum or predetermined distance of G from either end of the subset of adjacent channel coefficients for use in the equalizer.

As discussed in greater detail below, an overall coefficient index Y is utilized to select a subset of adjacent channel coefficients, according to a decision method incorporating the maximum magnitude index W, the maximum energy index V, and the predetermined offset integer G. This decision method (illustrated as a flow diagram in FIG. 10) is implemented as coefficient selector block 650 in FIGS. 6 and 7. The decision method may be described, in general, as first selecting a subset of adjacent coefficients having a maximum average energy. Due to the periodicity of the training signal, and given the unknown nature of precisely when sampling may have begun of this periodic signal, a maximum magnitude is selected to be in the middle range of the equalizer coefficients, that is, not too close to either the first or the last equalizer coefficients. As discussed in greater detail below, the subset of adjacent channel coefficients to form the initial values of the equalizer coefficients is then selected as the subset having the highest average energy if the maximum magnitude is in this middle range, or as a subset slightly shifted from the highest average energy subset if the maximum magnitude is not in this middle range.

Referring to FIG. 8A, FIG. 8A illustrates a maximum magnitude occurring near the first equalizer coefficient (Case 1) at an index value W and having a first maximum magnitude 810, where the offset integer G is greater than (W−V+P) modulo P, in which modulo is the mathematical operator that yields the remainder of a division operation (in this case, division by P). In order to shift the coefficients so that the maximum magnitude is at a distance of G from what will be the first equalizer coefficient represented by the coefficient index Y, Y is set equal to (W−G+P) modulo P. Referring to FIG. 8B, which illustrates a maximum magnitude occurring near the last equalizer coefficient (Case 2) at an index value W and having a second maximum magnitude 820, and (W−V+P) modulo P is greater than J−G, then Y is set equal to (W−(J+G)+P) modulo P. If the maximum magnitude already occurred a minimum or predetermined distance G from the first or last coefficient, in the particular subset of adjacent channel coefficients having maximum average energy represented by the index V, (i.e., if neither Case 1 or Case 2 is true), then Y is set equal to V.

This decision method may be implemented as a computer program or assembly language selection rule, which may be expressed as:

if $[(W − V + P)$ modulo $P] < G$ then
$\quad Y = (W − G + P)$ modulo $P$

-continued
```
else if [(W − V + P) modulo P] > J − G then
    Y = (W − (J + G) + P) modulo P
else
    Y = V
end if
``` in which Y is the coefficient index. The initial values for the equalizer coefficients are then represented as:

$$\{c(0), c(1), \ldots, c(J-1)\} = \{u(Y), u(Y+1), \ldots, u(Y+J-1)\}$$

in which the sequence on the left side of the equation is a set of complex numbers that is equal to the initial values for the equalizer coefficients. These initial values for the equalizer coefficients, selected in coefficient selector block 650, are transferred to the coefficient update generator for insertion into the equalizer structure shown in FIG. 5.

Figure 9:
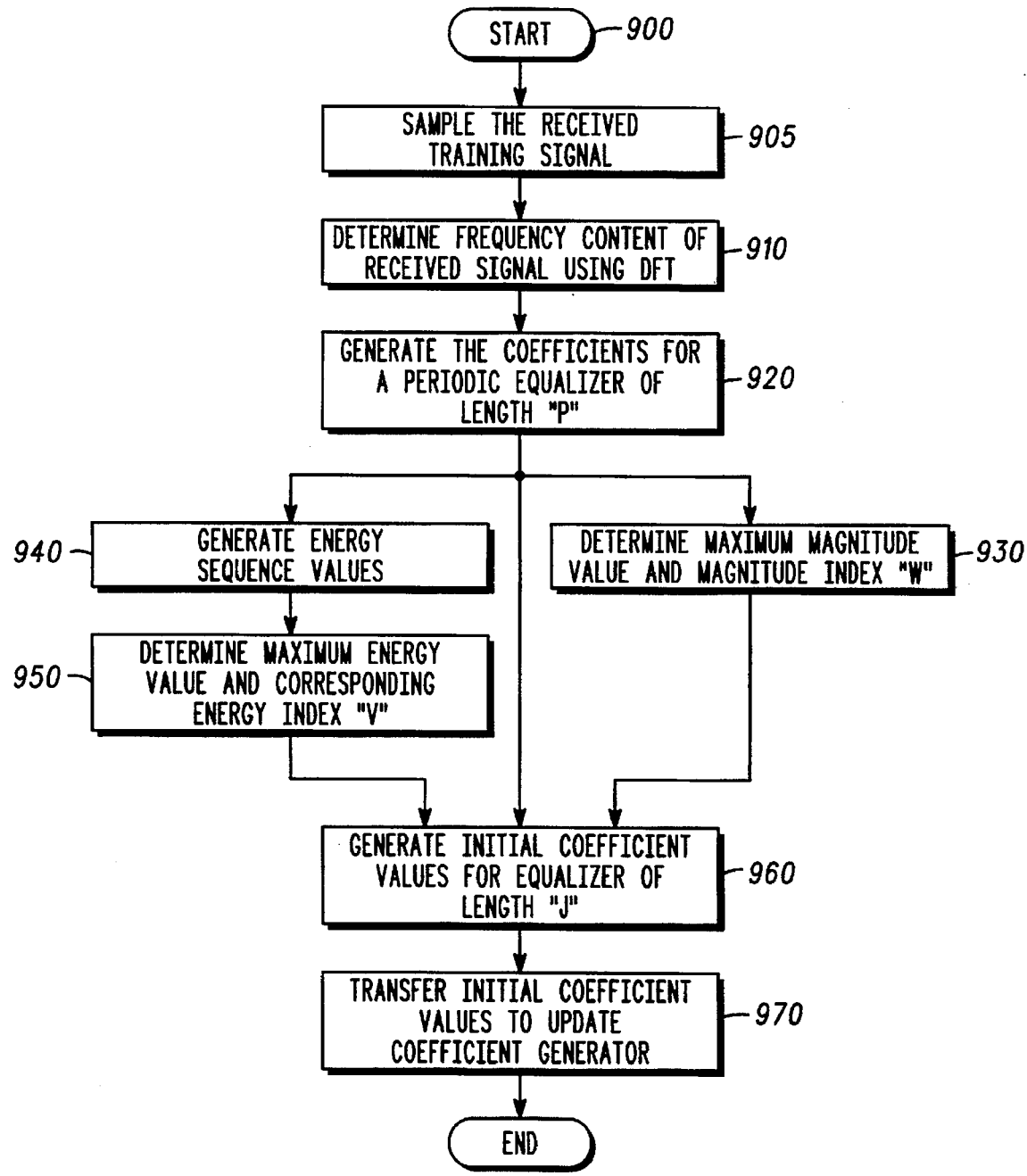
FIG. 9 is a flow diagram illustrating a method embodiment of the present invention.

FIG. 9 is a flow diagram for the method of the various embodiments of the present invention. The received training signal is sampled, step 905, and converted from the time domain to the frequency domain using a Discrete Fourier Transform (DFT), to determine the frequency content of the received signal, step 910. Coefficients for a periodic equalizer of length P are generated in response to the frequency content of the received signal and in light of the transmitted training signal known or assumed to have been transmitted over the channel, step 920, based upon deriving the inverse channel characteristics as an inverse of a transfer function (for the channel), i.e., the input divided by the output.

Continuing to refer to FIG. 9, the method proceeds to generate indices associated with subsets of adjacent channel coefficients. The maximum average energy index V is determined by generating a sequence of energy values for each subset, step 940, then determining the maximum value and setting the corresponding index equal to the energy index V, step 950. The maximum magnitude index W is determined by finding the periodic channel coefficient having the maximum magnitude and setting W equal to the corresponding index, step 930. The values for the initial equalizer coefficients are then generated, based upon or in response to V and W, step 960, using the selection method discussed above and illustrated in the flow chart of FIG. 10. The initial coefficient values are then transmitted to the coefficient update generator, step 970, to initialize the equalizer.

FIG. 10 is a flow diagram illustrating selecting coefficients in accordance with the method of the present invention using a coefficient index Y. The measured energy index V and magnitude index W are inputs to the first decision block, along with the predetermined values for the offset index G, the equalizer length J, and the sampled, periodic length P from the received training signal, step 1000. If (W−V+P)modulo P is less than G, then Y is set equal to (W−G+P) modulo P, step 1010 (yes branch) and step 1020. If (W−V+P)modulo P is not less than G (no branch of step 1010), then the method proceeds to step 1030. In step 1030, if (W−V+P) modulo P is greater than (J−G), then Y is set equal to (W−(J+G)) modulo P, step 1040. In step 1030, if (W−V+P) modulo P is not greater than (J−G), then Y is set equal to V, step 1050. Next, from this value of the coefficient index Y, the initial values for the equalizer coefficients are set equal to the subset of adjacent channel coefficients indexed beginning with Y, step 1060.

In summary, an embodiment of the present invention may be described as an equalizer coefficient generator 450, in which the equalizer coefficient generator 450 is coupleable to a modem 100 having an initial training period to train an equalizer from a transmitted training signal received via a channel 102 to form a received training signal, and in which the equalizer has a plurality of equalizer coefficients. The transmitted training signal, such as one in accordance with the V.34 protocol, has a predetermined sequence of symbols having known amplitude, phase and frequency characteristics. In addition, the modem has a data access arrangement and an analog-digital converter to receive and sample the received training signal to form a sampled signal. The equalizer coefficient generator 450 then comprises: first, an inverse channel (impulse response) generator 610 coupleable to the analog-digital converter to receive the sampled signal and to convert the sampled signal to form a finite impulse response characteristic of the inverse frequency response of the channel, the finite impulse response characteristic having a plurality of channel coefficients having a predetermined channel length P; second, a maximum energy detector 630 coupled to the inverse channel generator 610 to receive the plurality of channel coefficients, the maximum energy detector 630 responsive to detect a maximum energy of a plurality of subsets of adjacent channel coefficients, each of the plurality of subsets of adjacent channel coefficients having a predetermined length J and having subset coefficients, the maximum energy detector further responsive to form an energy index V corresponding to a subset of adjacent channel coefficients of the plurality of subsets of adjacent channel coefficients having the maximum energy; third, a maximum magnitude detector 640 coupled to the inverse channel generator 610 to receive the plurality of channel coefficients, the maximum magnitude detector responsive to detect a maximum magnitude of the plurality of channel coefficients and to form a magnitude index W corresponding to a channel coefficient of the plurality of channel coefficients having the maximum magnitude; and fourth, a coefficient selector coupled to the maximum energy detector 630, the maximum magnitude detector 640, and the inverse channel generator 610, for determining a subset of adjacent channel coefficients of the plurality of subsets of adjacent channel coefficients, from the energy index V and the magnitude index W, to form a set of initial values for the plurality of equalizer coefficients.

Another embodiment of the present invention consists of a modem 100 for data transmission and reception, with the modem having an initial training period to train an equalizer from a transmitted training signal received via a channel to form a received training signal, and the equalizer having a plurality of equalizer coefficients. The transmitted training signal also has a predetermined sequence of symbols having known amplitude, phase and frequency characteristics. The modem 100 embodiment then comprises: first, a data access arrangement 104 coupleable to the channel 102 to receive the received training signal; second, an analog-digital converter 105 coupled to the data access arrangement 104 to sample the received training signal to form a sampled signal; and third, a processor 106, the processor 106 coupled to the analog-digital converter 105 to receive the sampled signal, the processor 106 responsive to form a finite impulse response characteristic of the inverse frequency response of the channel, the finite impulse response characteristic having a plurality of channel coefficients having a predetermined channel length P; the processor 106 further responsive to detect a maximum energy of a plurality of subsets of adjacent channel coefficients, each of the plurality of subsets of adjacent channel coefficients having a predetermined length J and having subset coefficients, the processor 106 further responsive to form an energy index V corresponding to a subset of adjacent channel coefficients of the plurality of subsets of adjacent channel coefficients having the maximum energy; the processor further responsive to detect a maximum magnitude of the plurality of channel coefficients and to form a magnitude index W corresponding to a channel coefficient of the plurality of channel coefficients having the maximum magnitude; and the processor 106 further responsive to determine a subset of adjacent channel coefficients of the plurality of subsets of adjacent channel coefficients, from the energy index V and the magnitude index W, to form a set of initial values for the plurality of equalizer coefficients.

Also in summary, the method embodiment of the present invention may also be described as a method for generating a set of initial values for a plurality of equalizer coefficients, from a transmitted training signal received via a channel to form a received training signal, in which the transmitted training signal has a predetermined sequence of symbols having known amplitude, phase and frequency characteristics. The method then comprises:

(a) sampling the received training signal to form a sampled signal, step 905;

(b) converting the sampled signal to form a finite impulse response characteristic of the inverse frequency response of the channel, the finite impulse response characteristic having a plurality of channel coefficients having a predetermined channel length P, steps 910 and 920;

(c) detecting a maximum energy of a plurality of subsets of adjacent channel coefficients, each of the plurality of subsets of adjacent channel coefficients having a predetermined length J and having subset coefficients, and forming an energy index V corresponding to a subset of adjacent channel coefficients of the plurality of subsets of adjacent channel coefficients having the maximum energy, steps 940 and 950;

(d) detecting a maximum magnitude of the plurality of channel coefficients and forming a magnitude index W corresponding to a channel coefficient of the plurality of channel coefficients having the maximum magnitude, step 930; and (e) determining a subset of adjacent channel coefficients of the plurality of subsets of adjacent channel coefficients, from the energy index V and the magnitude index W, to form the set of initial values for the plurality of equalizer coefficients, step 960.

A significant advantage of the various apparatus and method embodiments of the present invention is that significantly higher data rates may be achieved when an equalizer has been initialized in accordance with the present invention. In addition, in accordance with the present invention, the effective size of an equalizer has been reduced, such that either fewer taps are needed or more is accomplished from the same number of taps, resulting in decreased computation time and more efficient digital signal processing. Yet another advantage of the various apparatus and method embodiments of the present invention, non-arbitrary equalizer coefficients are generated to more accurately initialize an equalizer during a potentially short period of time for training, in order to subsequently permit an adaptive algorithm to generate coefficients to equalize for a broad spectrum of channel distortions and other impairments.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

We claim:

1. An equalizer coefficient generator, the equalizer coefficient generator coupleable to a modem having an initial training period to train an equalizer from a transmitted training signal received via a channel to form a received training signal, the equalizer having a plurality of equalizer coefficients, the transmitted training signal having a predetermined sequence of symbols having known amplitude, phase and frequency characteristics, the modem having a data access arrangement and an analog-digital converter to receive and sample the received training signal to form a sampled signal, the equalizer coefficient generator comprising:

an inverse channel generator coupleable to the analog-digital converter to receive the sampled signal and to convert the sampled signal to form a finite impulse response characteristic of the inverse frequency response of the channel, the finite impulse response characteristic having a plurality of channel coefficients having a predetermined channel length P;

a maximum energy detector coupled to the inverse channel generator to receive the plurality of channel coefficients, the maximum energy detector responsive to detect a maximum energy of a plurality of subsets of adjacent channel coefficients, each of the plurality of subsets of adjacent channel coefficients having a predetermined length J and having subset coefficients, the maximum energy detector further responsive to form an energy index V corresponding to a subset of adjacent channel coefficients of the plurality of subsets of adjacent channel coefficients having the maximum energy;

a maximum magnitude detector coupled to the inverse channel generator to receive the plurality of channel coefficients, the maximum magnitude detector responsive to detect a maximum magnitude of the plurality of channel coefficients and to form a magnitude index W corresponding to a channel coefficient of the plurality of channel coefficients having the maximum magnitude; and a coefficient selector coupled to the inverse channel generator, the maximum energy detector, and the maximum magnitude detector, for determining a subset of adjacent channel coefficients of the plurality of subsets of adjacent channel coefficients, from the energy index V and the magnitude index W, to form a set of initial values for the plurality of equalizer coefficients.

2. The equalizer coefficient generator of claim 1, wherein the inverse channel generator, the maximum energy detector, the maximum magnitude detector, and the coefficient selector am embodied in a digital signal processor.

3. The equalizer coefficient generator of claim 1, wherein the inverse channel generator, the maximum energy detector, the maximum magnitude detector, and the coefficient selector am embodied in a processor.

4. The equalizer coefficient generator of claim 1, wherein the inverse channel generator further comprises:

a translator, the translator coupleable to the analog-digital converter to receive the sampled signal and to convert the sampled signal to a frequency domain signal;

a frequency response generator coupled to the translator to receive the frequency domain signal, the frequency response generator responsive to generate an inverse channel frequency characteristic; and an inverse translator coupled to the frequency response generator to receive the inverse channel frequency characteristic and to convert the inverse channel frequency characteristic to the finite impulse response characteristic of the inverse frequency response of the channel.

5. The equalizer coefficient generator of claim 4, wherein the translator is responsive to perform a discrete Fourier transformation to convert the sampled signal to the frequency domain signal.

6. The equalizer coefficient generator of claim 4, wherein the inverse translator is responsive to perform an inverse discrete Fourier transformation to convert the inverse channel frequency characteristic to the finite impulse response characteristic of the inverse frequency response of the channel.

7. The equalizer coefficient generator of claim 4, wherein the frequency response generator is responsive to generate the inverse channel frequency characteristic by $$H(e^{j\pi f_i T}) = \frac{S(e^{j\pi f_i T})R^*(e^{j\pi f_i T})}{|R(e^{j\pi f_i T})|^2 + \left| R\left( e^{j\pi f_i + \frac{1}{T})T} \right) \right|^2}$$

in which $S(e^{j\pi f_i T})$ is a frequency domain representation of the transmitted training signal;

$R(e^{j\pi f_i T})$ is a frequency domain representation of the received training signal;

and $H(e^{j\pi f_i T})$ is a frequency response of the equalizer.

8. The equalizer coefficient generator of claim 1, wherein each subset of adjacent channel coefficients of the plurality of subsets of adjacent channel coefficients is a sequence of indexed adjacent channel coefficients, wherein each subset of adjacent channel coefficients of the plurality of subsets of adjacent channel coefficients has a length J and has a plurality of coefficients, wherein the plurality of subsets of adjacent channel coefficients is a predetermined amount corresponding to channel length P, and corresponding to each subset of adjacent channel coefficients of the plurality of subsets of adjacent channel coefficients is an index "n" and an energy value e(n), in which the energy value e(n) is represented by:

$$e(n) = \sum_{m=0}^{J-1} |u(n+m)|^2$$

in which n=0, 1, 2, . . . , P−1, and in which {u(0), u(1), u(2), . . . , u(P−1)} are the channel coefficients.

9. The equalizer coefficient generator of claim 8, wherein the maximum energy detector selects the energy index V corresponding to the maximum value of the energy value e(n).

10. The equalizer coefficient generator of claim 1, wherein an offset index G has a predetermined value; wherein the coefficient selector is further responsive to select a subset index "Y" by setting Y equal to (W−G+P) modulo P when (W−V+P) modulo P is less than G, by setting Y equal to (W−(J+G)+P) modulo P when (W−V+P) modulo P is greater than J−G, and by setting Y equal to V otherwise; and wherein the coefficient selector is further responsive to form the set of initial values for the plurality of equalizer coefficients by setting the set of initial values for the plurality of equalizer coefficients equal to a set of values corresponding to a sequence of channel coefficients indexed by Y as {u(Y), u(Y+1), . . . , u(Y+J−1)}.

11. A modem for data transmission and reception, the modem having an initial training period to train an equalizer from a transmitted training signal received via a channel to form a received training signal, the equalizer having a plurality of equalizer coefficients, the transmitted training signal having a predetermined sequence of symbols having known amplitude, phase and frequency characteristics, the modem comprising:

a data access arrangement coupleable to the channel to receive the received training signal;

an analog-digital converter coupled to the data access arrangement to sample the received training signal to form a sampled signal; and a processor, the processor coupled to the analog-digital converter to receive the sampled signal, the processor responsive to form a finite impulse response characteristic of the inverse frequency response of the channel, the finite impulse response characteristic having a plurality of channel coefficients having a predetermined channel length P; the processor further responsive to detect a maximum energy of a plurality of subsets of adjacent channel coefficients, each of the plurality of subsets of adjacent channel coefficients having a predetermined length J and having subset coefficients, the processor further responsive to form an energy index V corresponding to a subset of adjacent channel coefficients of the plurality of subsets of adjacent channel coefficients having the maximum energy; the processor further responsive to detect a maximum magnitude of the plurality of channel coefficients and to form a magnitude index W corresponding to a channel coefficient of the plurality of channel coefficients having the maximum magnitude; and the processor further responsive to determine a subset of adjacent channel coefficients of the plurality of subsets of adjacent channel coefficients, from the energy index V and the magnitude index W, to form a set of initial values for the plurality of equalizer coefficients.

12. The modem of claim 11, wherein the processor is further responsive to perform a discrete Fourier transformation to convert the sampled signal to a frequency domain signal.

13. The modem of claim 11, wherein the processor is further responsive to perform an inverse discrete Fourier transformation to convert an inverse channel frequency characteristic to the finite impulse response characteristic of the inverse frequency response of the channel.

14. The modem of claim 11, wherein the processor is further responsive to generate an inverse channel frequency characteristic by $$H(e^{j\pi f_i T}) = \frac{S(e^{j\pi f_i T})R^*(e^{j\pi f_i T})}{|R(e^{j\pi f_i T})|^2 + \left| R\left( e^{j\pi f_i + \frac{1}{T})T} \right) \right|^2}$$

in which $S(e^{j\pi f_i T})$ is a frequency domain representation of the transmitted training signal;

$R(e^{j\pi f_i T})$ is a frequency domain representation of the received training signal;

and $H(e^{j\pi f_i T})$ is a frequency response of the equalizer.

15. The modem of claim 11, wherein each subset of adjacent channel coefficients of the plurality of subsets of adjacent channel coefficients is a sequence of indexed adjacent channel coefficients, wherein each subset of adjacent channel coefficients of the plurality of subsets of adjacent channel coefficients has a length J and has a plurality of coefficients, wherein the plurality of subsets of adjacent channel coefficients is a predetermined amount corresponding to channel length P, and corresponding to each subset of adjacent channel coefficients of the plurality of subsets of adjacent channel coefficients is an index "n" and an energy value e(n), in which the energy value e(n) is represented by:

$$e(n) = \sum_{m=0}^{J-1} |u(n+m)|^2$$

in which n=0, 1, 2, . . . , P−1, and in which {u(0), u(1), u(2), . . . , u(P−1)} are the channel coefficients.

16. The modem of claim 15, wherein the processor is further responsive to select the energy index V corresponding to the maximum value of the energy value e(n).

17. The modem of claim 11, wherein an offset index G has a predetermined value; wherein the processor is further responsive to select a subset index "Y" by setting Y equal to (W−G+P) modulo P when (W−V+P) modulo P is less than G, by setting Y equal to (W−(J+G)+P) modulo P when (W−V+P) modulo P is greater than J−G, and by setting Y equal to V otherwise; and wherein the processor is further responsive to form the set of initial values for the plurality of equalizer coefficients by setting the set of initial values for the plurality of equalizer coefficients equal to a set of values corresponding to a sequence {u(Y), u(Y+1), . . . , u(Y+J−1)}.

18. A method for generating a set of initial values for a plurality of equalizer coefficients, from a transmitted training signal received via a channel to form a received training signal, the transmitted training signal having a predetermined sequence of symbols having known amplitude, phase and frequency characteristics, the method comprising:

(a) sampling the received training signal to form a sampled signal;

(b) converting the sampled signal to form a finite impulse response characteristic of the inverse frequency response of the channel, the finite impulse response characteristic having a plurality of channel coefficients having a predetermined channel length P;

(c) detecting a maximum energy of a plurality of subsets of adjacent channel coefficients, each of the plurality of subsets of adjacent channel coefficients having a predetermined length J and having subset coefficients, and forming an energy index V corresponding to a subset of adjacent channel coefficients of the plurality of subsets of adjacent channel coefficients having the maximum energy;

(d) detecting a maximum magnitude of the plurality of channel coefficients and forming a magnitude index W corresponding to a channel coefficient of the plurality of channel coefficients having the maximum magnitude; and (e) determining a subset of adjacent channel coefficients of the plurality of subsets of adjacent channel coefficients, from the energy index V and the magnitude index W, to form the set of initial values for the plurality of equalizer coefficients.

19. The method of claim 18, wherein the converting step (b) further comprises:

(b1) converting the sampled signal to a frequency domain signal;

(b2) generating an inverse channel frequency characteristic from the frequency domain signal; and (b3) converting the inverse channel frequency characteristic to the finite impulse response characteristic of the inverse frequency response of the channel.

20. The method of claim 19, wherein the converting step (b1) further comprises performing a discrete Fourier transformation to convert the sampled signal to the frequency domain signal.

21. The method of claim 19, wherein the converting step (b3) further comprises performing an inverse discrete Fourier transformation to convert the inverse channel frequency characteristic to the finite impulse response characteristic of the inverse frequency response of the channel.

22. The method of claim 19, wherein the generating step (b2) further comprises generating the inverse channel frequency characteristic by $$H(e^{j\pi f_i T}) = \frac{S(e^{j\pi f_i T})R^*(e^{j\pi f_i T})}{|R(e^{j\pi f_i T})|^2 + \left| R\left( e^{j\pi (f_i + \frac{1}{T})T} \right) \right|^2}$$

in which $S(e^{j\pi f_i T})$ is a frequency domain representation of the transmitted training signal;

$R(e^{j\pi f_i T})$ is a frequency domain representation of the received training signal;

and $H(e^{j\pi f_i T})$ is a frequency response of the equalizer.

23. The method of claim 18, wherein each subset of adjacent channel coefficients of the plurality of subsets of adjacent channel coefficients is a sequence of indexed adjacent channel coefficients, wherein each subset of adjacent channel coefficients of the plurality of subsets of adjacent channel coefficients has a length J and has a plurality of coefficients, wherein the plurality of subsets of adjacent channel coefficients is a predetermined amount corresponding to channel length P, and corresponding to each subset of adjacent channel coefficients of the plurality of subsets of adjacent channel coefficients is an index "n" and an energy value e(n), in which the energy value e(n) is represented by:

$$e(n) = \sum_{m=0}^{J-1} |u(n+m)|^2$$

in which n=0, 1, 2, . . . , P−1, and in which {u(0), u(1), u(2), . . . , u(P−1)} are the channel coefficients.

24. The method of claim 23, wherein step (c) further comprises selecting the energy index V corresponding to the maximum value of the energy value e(n).

25. The method of claim 18, wherein an offset index G has a predetermined value; wherein the determining step (e) further comprises:

(e1) selecting a subset index "Y" by setting Y equal to (W−G+P) modulo P when (W−V+P) modulo P is less than G, by setting Y equal to (W−(J+G)+P) modulo P when (W−V+P) modulo P is greater than J−G, and by setting Y equal to V otherwise; and (e2) forming the set of initial values for the plurality of equalizer coefficients by setting the set of initial values for the plurality of equalizer coefficients equal to a set of values corresponding to a sequence {u(Y), u(Y+1), . . . , u(Y+J−1)}.

* * * * *